UNITED STATES PATENT OFFICE.

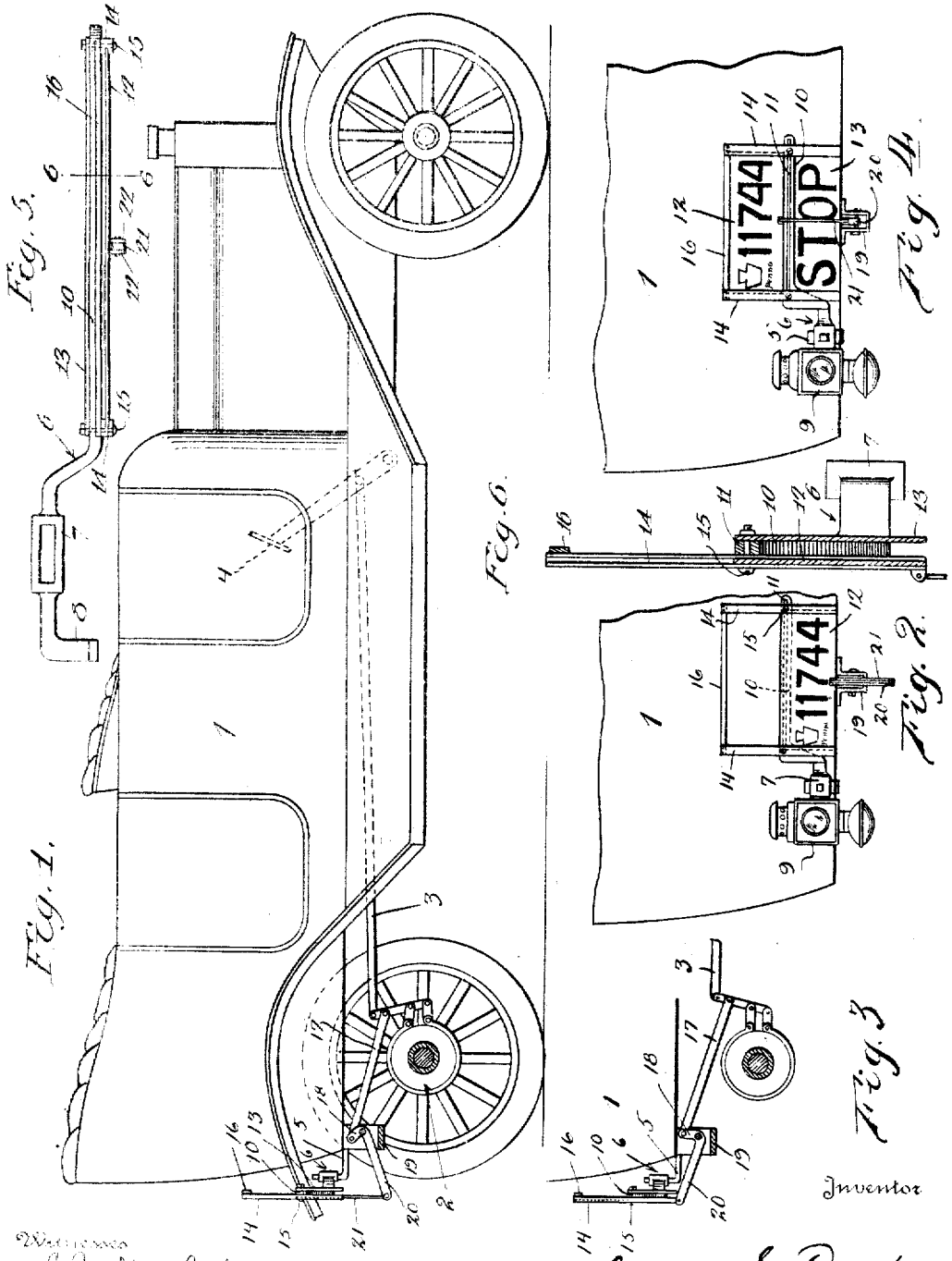

SOLOMON S. DAVIS, OF NEW CASTLE, PENNSYLVANIA.

AUTOMATIC SIGNAL DEVICE.

1,166,332.   Specification of Letters Patent.   Patented Dec. 28, 1915.

Application filed November 20, 1914. Serial No. 873,225.

*To all whom it may concern:*

Be it known that I, SOLOMON S. DAVIS, a citizen of the United States, residing at New Castle, in the county of Lawrence and State of Pennsylvania, have invented certain new and useful Improvements in Automatic Signal Devices, of which the following is a specification.

My invention relates to signal devices, particularly to traffic signals carried by motor vehicles, and has for its object the provision of a warning signal mounted upon the rear of an automobile in proximity to the tail light and operatively connected with the brake rod whereby a visible signal will be automatically given when the brake is applied preparatory to stopping or turning a corner so that drivers of following vehicles will be warned of the operator's intentions, with the consequent elimination of the danger of rear end collisions, and avoiding the present objectionable alternative plans of the operator holding out a hand as a signal or looking back to see if it is safe to slacken speed.

The present signaling in vogue, holding out a hand, is objectionable inasmuch as it leaves the control of the automobile to one hand alone, which is liable to be dangerous. Looking back to see whether it is safe to slacken speed for a turn or to stop is particularly objectionable as the driver can not see what is going on ahead, the danger of this being obvious in congested districts. Signal devices have been put in use requiring display. A driver may forget to operate such a signal and serious damage and injury may signal and serious damage and injury may result from such inadvertence.

The present invention provides that the signal be operated entirely automatically without the volition of the driver and further consists in the provision of a warning signal in the form of a sign normally covered by the license number and exposed when the brakes are applied.

An additional object is the provision of a signal device of this character which may be associated with the ordinary form of license number holder commonly in use.

With these and other objects and advantages in view, such as simplicity, cheapness in manufacture, ease of installation and the general improvement of the art, my invention consists in the details of construction and arrangement to be hereinafter more fully described, and illustrated in the accompanying drawings, in which:

Figure 1 is a diagrammatic side elevation of an automobile showing my device applied thereto, Fig. 2 is a fragmentary rear elevation thereof, Fig. 3 is a fragmentary view similar to Fig. 1 showing the parts moved to display the signal, Fig. 4 is a rear elevation showing the signal displayed, Fig. 5 is a detail plan view of the signal supporting member, and Fig. 6 is a cross sectional view thereof on the line 6—6 of Fig. 5.

Referring more particularly to the drawings, the numeral 1 designates an automobile provided with the usual brakes 2 on the rear wheels operated by a rod 3 connected with the foot pedal 4. The automobile is provided with the bracket 5 upon which is secured the license number supporting bracket 6, which comprises the socket member 7 secured upon the bracket 5, the arm 8 supporting the tail lamp 9, and the arm 10 having the slot 11. Ordinarily the license number plate 12 is secured on the arm 10 by screws passing through the plate and the slot 11.

In carrying out my invention, I provide a signal plate 13 secured on the rear side of the arm 10 and bearing the legend "Stop." A pair of guides 14 channeled in cross section, are secured upon the front of the arm 10 by screws 15 which pass through the guides, the slot 11, and the signal plate 13. The guides are held rigidly by a cross bar 16 connecting their upper ends. The license number plate 12 is disposed in the guides 14 and normally covers the signal plate 13.

In order that the number plate 12 may be moved to expose the signal plate 13, I provide a rod 17 pivotally connected with the brake rod 3 and pivotally connected with the short arm 18 of a bell crank lever pivoted within a U-shaped bracket 19 secured on the body of the automobile. The long arm 20 of the bell crank lever is pivotally connected with one end of a link 21 which has its other end pivotally connected within ears 22 on the license number plate 12. When the pedal 4 is pushed forward to apply the brakes, as when preparing to turn a corner or in stopping, the rod 3 will be moved forward in setting the brakes 2, whereupon the rod 17 will be moved forward, pulling the short arm 18 of the bell crank lever forward and elevating the long arm with the resultant lifting of the number plate 12 through the medium of the link 21 and the exposing of the signal plate 13. As the light from the tail lamp shines upon both plates, the warning "Stop" will be readily visible to the drivers of following vehicles. When the brakes are released the rod 17 will be moved backward returning the number plate 12 to its position covering the signal plate. If desired, the bell crank lever may be inverted, and the guides extended downwardly so that the number plate may be moved down instead of up to expose the signal. Some automobiles are not supplied with service wheel brakes as shown in the drawings but are equipped with a transmission brake instead. In such a case, the rod 17 would be made sufficiently long to extend forward and be attached directly to the pedal.

From the foregoing description and a study of the drawings it will be apparent that I have thus provided a simple, inexpensive and efficient signal for automobiles which may be readily installed and which will be automatically operated upon application of the brakes.

Having thus described my invention what I claim is:

An automobile signal comprising a bracket, a stationary signal plate secured to said bracket, a pair of guides also secured to said bracket and spaced in front of said plate, said guides being channeled in cross-section, a second plate normally covering said first named plate slidably mounted in said guides, and means connected with said second named plate for sliding it from in front of said first named plate, simultaneously exposing both plates.

In testimony whereof I hereto affix my signature in the presence of two witnesses.

SOLOMON S. DAVIS.

Witnesses:
WILLIAM J. UBER,
THOMAS W. DICKEY.

It is hereby certified that in Letters Patent No. 1,166,332, granted December 28, 1915, upon the application of Solomon S. Davis, of New Castle, Pennsylvania, for an improvement in "Automatic Signal Devices," errors appear in the printed specification requiring correction as follows: Page 1, after line 35, insert the syllable and words *ing a separate and voluntary action in their;* same page, strike out line 38; same page, line 81, the imperfect word should read *plate;* at the head of the specification the number should be *1,166,332;* and that the said Letters Patent should be read with these corrections therein that the same may conform to the record of the case in the Patent Office.

Signed and sealed this 18th day of January, A. D., 1916.

[SEAL.]

J. T. NEWTON,
*Acting Commissioner of Patents.*

Cl. 40—62.